United States Patent
Forster

(10) Patent No.: US 9,697,455 B2
(45) Date of Patent: Jul. 4, 2017

(54) USING REACTIVE COUPLING OF A PRINTED RFID CHIP ON A STRAP TO ALLOW THE PRINTED MATERIAL TO BE OVER-LAMINATED WITH A BARRIER FILM AGAINST OXYGEN AND MOISTURE INGRESS

(71) Applicant: Avery Dennison Retail Information Services, LLC, Mentor, OH (US)

(72) Inventor: Ian James Forster, Chelmsford/Essex (GB)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 0 days.

(21) Appl. No.: 14/583,255

(22) Filed: Dec. 26, 2014

(65) Prior Publication Data

US 2016/0189021 A1 Jun. 30, 2016

(51) Int. Cl.
*G06K 19/06* (2006.01)
*G06K 19/077* (2006.01)

(52) U.S. Cl.
CPC . *G06K 19/07722* (2013.01); *G06K 19/07728* (2013.01); *G06K 19/07752* (2013.01); *G06K 19/07756* (2013.01); *G06K 19/07773* (2013.01)

(58) Field of Classification Search
CPC .......... B42D 15/10; G06K 19/077; G06K 19/07749; G07F 7/1008
USPC .................................................. 235/492, 488
See application file for complete search history.

(56) References Cited

U.S. PATENT DOCUMENTS

| 7,551,141 | B1 | 6/2009 | Hadley |
| 2001/5001785 | | 1/2005 | Ferguson |
| 2011/0139878 | A1 | 6/2011 | Grasset |
| 2011/0284643 | A1* | 11/2011 | Yamagajo ........ G06K 19/07749 235/492 |

OTHER PUBLICATIONS

International Search Report and Written Opinion prepared for PCT/US2015/0066966 dated Mar. 3, 2016.

* cited by examiner

*Primary Examiner* — Karl D Frech
(74) *Attorney, Agent, or Firm* — Avery Dennison Retail Information Services, LLC

(57) ABSTRACT

An RFID device using a printed electronic circuit (PEC) is disclosed. The PEC or electronic circuit which includes printed elements is coupled to a conductor structure, such as an antenna, by reactive means, such as an electric field, a magnetic field, or a combination of both. The RFID device comprises a base layer and a conductive layer (antenna structure) disposed over the base layer. A dielectric layer is then disposed over at least a portion of the conductive layer. A barrier layer is then disposed over the dielectric layer and fully covers the PEC to protect against oxygen and moisture ingress. Further, the PEC is typically attached to a carrier or strap to facilitate coupling between the antenna structure and PEC. In another embodiment, the barrier layer can be replaced with an adhesive layer that acts as both the barrier layer and the dielectric layer.

16 Claims, 2 Drawing Sheets

USING REACTIVE COUPLING OF A PRINTED RFID CHIP ON A STRAP TO ALLOW THE PRINTED MATERIAL TO BE OVER-LAMINATED WITH A BARRIER FILM AGAINST OXYGEN AND MOISTURE INGRESS

BACKGROUND

The present invention relates generally to a radio-frequency identification (RFID) device comprising a printed electronic circuit (PEC). Specifically, the PEC or electronic circuit which includes printed elements is coupled to a conductor structure, such as an antenna, by reactive means, such as an electric field, a magnetic field, or a combination of both. In accordance with embodiments of the present subject matter, the PEC may be an RFID device, but may also be other forms of circuits, such as a sensor and its associated signal processing coupled to a standard chip. Accordingly, the present specification makes specific reference thereto.

The use of radio frequency identification (RFID) to identify one of a plurality of items is well known. Typical RFID tags or integrated circuits include a microprocessor, also known as a microchip, electrically connected to an antenna. Alternatively, the microchip is first attached to a pad having electrical leads that provides a larger attachment or "landing" area. This is typically referred to as a "strap" or "interposer." The strap is then attached to the antenna. Specifically, interposers include conductive leads or pads that are electrically coupled to the contact pads of the chips for coupling to the antennas.

The microprocessor stores data, which can include identifying data unique to a specific item, which is transmitted to an external receiver (interrogator) for reading by an operator and processing of the item. The microprocessor also modulates a radio frequency (RF) signal that is transmitted via the antenna. The external reader (interrogator) is used to capture the data transmitted by the RFID tag. RFID tags can be attached to or associated with items for inventory control, shipment control, loss prevention, and the like. RFID tags are particularly useful in identifying, tracking and controlling items such as packages, pallets, consumer goods, and other product containers. The location of each item can be tracked and information identifying the owner of the item or specific handling requirements, can be encoded into the chip contained in the RFID tag and later read by a scanning device or reader which is capable of decoding and displaying the information previously encoded on the chip.

Accordingly, RFID tags can be attached to or associated with items entering or within a supply chain or retail environment and the identifying information received can be processed for various reasons in a variety of manners. However, the RFID tag can be subject to many factors which degrade the performance of printed semiconductor materials, such as those created using polyaniline and its derivatives, amorphous silicon, or metal oxides.

The present invention discloses an RFID device comprising a PEC. Specifically, the PEC or electronic circuit which includes printed elements is coupled to a conductor structure, such as an antenna, by reactive means, such as an electric field, a magnetic field, or a combination of both. Use of a coupling mechanism that does not rely on a conductive connection, via a conductive adhesive or other means, allows the PEC to be fully covered with a barrier layer, to stop ingress of such things as moisture, oxygen, etc.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an RFID device comprising a printed electronic circuit (PEC). Specifically, the PEC or electronic circuit which includes printed elements is coupled to a conductor structure, such as an antenna, by reactive means, such as an electric field, a magnetic field, or a combination of both. The RFID device comprises a base layer and a conductive layer disposed over at least a portion of the base layer. The conductive layer is typically an antenna structure which is fully contained within the perimeter of the base layer.

A dielectric layer is then disposed over at least a portion of the conductive layer. The dielectric layer is a coupling adhesive that allows the PEC to be adhered and coupled to the antenna structure. A protective coating layer (or barrier layer) is then disposed over at least a portion of the dielectric layer. A printed electronic circuit (PEC) is then disposed over at least a portion of the protective coating layer, such that the protective coating layer fully covers the PEC to protect against oxygen and moisture ingress. Further, the PEC is typically attached to a carrier or strap (or interposer). Strap or interposer may further include conductive leads to facilitate coupling between antenna structure and PEC.

In another embodiment, the RFID device comprises an adhesive layer coated onto the PEC during manufacture, which acts as the barrier layer and as the dielectric layer. Thus, the adhesive layer allows the PEC to be adhered and coupled to the conductive layer (antenna structure), and fully covers the PEC to protect against oxygen and moisture ingress. The adhesive may be formed from any suitable adhesive material as is known in the art, such as a pressure sensitive adhesive (PSA) or a hot melt adhesive, and is typically coated onto the PEC as part of its manufacturing process.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
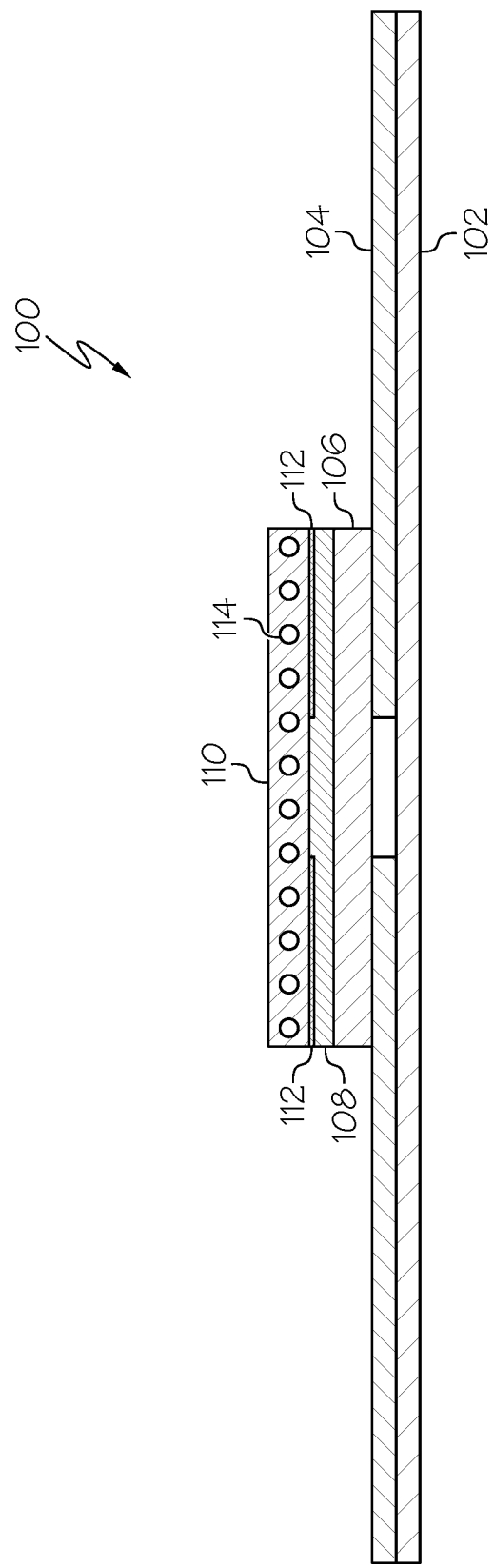
FIG. 1 illustrates a cross-sectional side view of the RFID device wherein the PEC is coupled to the antenna structure via a barrier layer in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses an RFID device comprising a PEC, or an electronic circuit including printed elements that is coupled to a conductor structure, such as an antenna, by reactive means. Using reactive coupling of a printed RFID chip on a strap allows the PEC or printed material to be over-laminated (i.e., fully covered) with a barrier layer to prevent against oxygen and moisture ingress.

Referring initially to the drawings, FIG. 1 illustrates a first exemplary embodiment of an RFID device 100 comprising a printed electronic circuit (PEC). Specifically, the printed electronic circuit (PEC) or electronic circuit which includes printed elements is coupled to a conductor structure, such as an antenna, by reactive means, such as an electric field (i.e., capacitive coupling), a magnetic field (i.e., inductive coupling), or a combination of both. The RFID device 100 comprises a base layer 102 and a conductive layer 104 disposed over at least a portion of the base layer 102. The base layer 102 can be any material, for example paper, coated paper, films, polyester, polyethylene terephthalate (PET), laminations of film and paper or any other suitable material as is known in the art.

The conductive layer 104 is typically an antenna structure which is fully contained within the perimeter of the base layer 102. The antenna structure can be any suitable size, shape, and configuration as is known in the art without affecting the overall concept of the invention. One of ordinary skill in the art will appreciate that the shape and size of the antenna structure as shown in FIG. 1 is for illustrative purposes only and many other shapes and sizes of the antenna structure are well within the scope of the present disclosure. Although dimensions of the antenna structure (i.e., length, width, and height) are important design parameters for good performance, the antenna structure may be any shape or size that ensures optimal performance and sensitivity during use.

Antenna structure 104 can be any of a variety of materials, for example aluminum, copper, silver or another thin, conductive material, for example etched or hot-stamped metal foil, or any other suitable material as is known in the art. The antenna structure 104 further comprises at least two conductor pads, or any suitable number of conductor pads as is known in the art.

A dielectric layer 106 is then disposed over at least a portion of the conductive layer 104. The dielectric layer 106 is a coupling adhesive that allows the PEC 110 to be adhered and coupled to the antenna structure 104, and that may be formed from any suitable adhesive material as is known in the art.

A protective coating layer (or barrier layer) 108 is then disposed over at least a portion of the dielectric layer 106. The barrier layer 108 is a thin PET film, or a printed or spun coated material such as a polyimide. This barrier layer 108 stops ingress of such things as moisture, oxygen, etc. that are known to degrade the performance of common printed semiconductor materials such as those created using polyaniline and its derivatives, amorphous silicon or metal oxides.

A printed electronic circuit (PEC) 110 disposed over at least a portion of the protective coating layer 108, such that the protective coating layer 108 fully covers the PEC 110 to protect against oxygen and moisture ingress. Typically, the continuous coating 108, without apertures, is easier to apply in production. The PEC 110 further comprises at least two conductor pads 112 disposed on at least a portion of the PEC 110, wherein the at least two conductor pads 112 on the PEC 110 are capacitively coupled to the at least two conductor pads on the conductive layer 104.

Further, the PEC 110 is typically attached to a carrier or strap 114 (or interposer). Strap or interposer 114 may further include conductive leads to facilitate coupling between antenna structure 104 and PEC 110. Coupling between antenna structure 104 and strap or interposer 114 may be a direct, conductive coupling or may be an indirect coupling, such as a capacitive or inductive coupling or any combination of conductive, capacitive and inductive coupling.

The PEC 110 carried on the strap 114 may be an RFID device, designed to operate at frequencies such as 13.56 MHz, high frequency (HF), or between 800 MHz and 1,000 MHz, commonly described as ultra-high frequency (UHF), and is coupled to an antenna structure 104. However, other forms of circuits can be used, such as a sensor and its associated signal processing, coupled to a standard chip made out of crystal silicon that handles the communication with the reader system.

Figure 2:
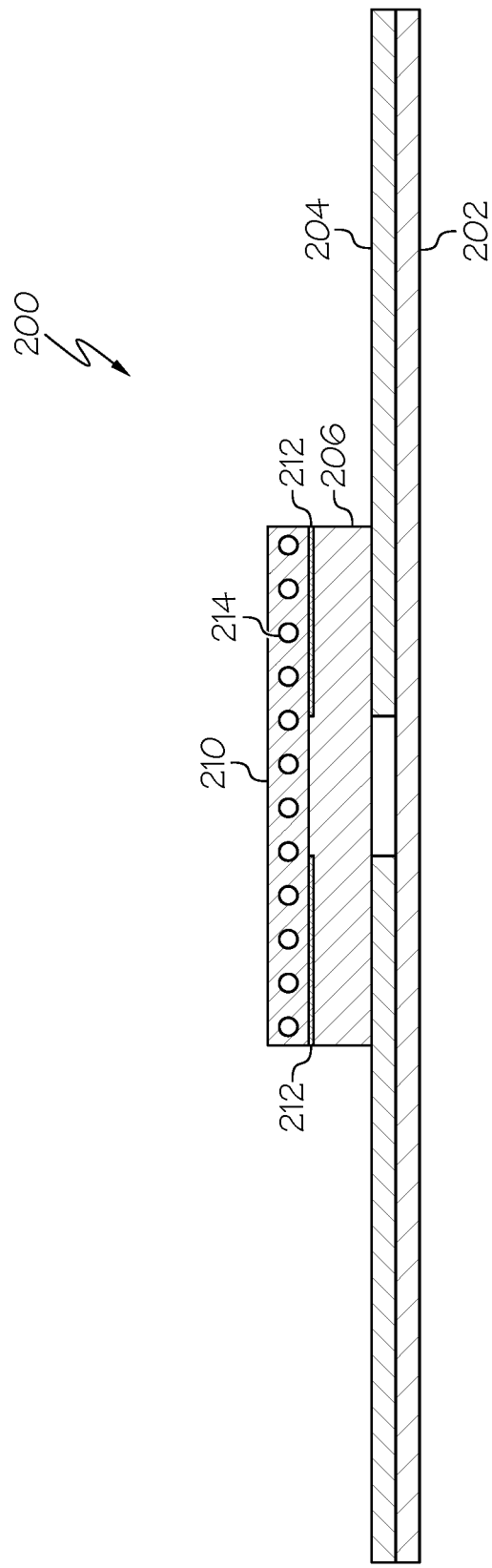
FIG. 2 illustrates a cross-sectional side view of the RFID device wherein the PEC is coupled to the antenna structure via the adhesive layer, which also acts as the barrier layer in accordance with the disclosed architecture.

Generally, FIG. 2 illustrates a second exemplary embodiment of an RFID device 200 using a printed electronic circuit (PEC). Specifically, the printed electronic circuit (PEC) or electronic circuit which includes printed elements is coupled to a conductor structure, such as an antenna, by reactive means, such as an electric field (i.e., capacitive coupling), a magnetic field (i.e., inductive coupling), or a combination of both. The RFID device 200 comprises a base layer 202 and a conductive layer 204 disposed over at least a portion of the base layer 202. The base layer 202 can be any material, for example paper, coated paper, films, polyester, polyethylene terephthalate (PET), laminations of film and paper or any other suitable material as is known in the art.

The conductive layer 204 is typically an antenna structure which is fully contained within the perimeter of the base layer 202. The antenna structure 204 can be any suitable size, shape, and configuration as is known in the art without affecting the overall concept of the invention. One of ordinary skill in the art will appreciate that the shape and size of the antenna structure as shown in FIG. 2 is for illustrative purposes only and many other shapes and sizes of the antenna structure are well within the scope of the present disclosure. Although dimensions of the antenna structure (i.e., length, width, and height) are important design parameters for good performance, the antenna structure may be any shape or size that ensures optimal performance and sensitivity during use.

Antenna structure 204 can be any of a variety of materials, for example aluminum, copper, silver or another thin, conductive material, for example etched or hot-stamped metal foil, or any other suitable material as is known in the art. The antenna structure 204 further comprises at least two conductor pads, or any suitable number of conductor pads as is known in the art.

A dielectric layer 206 is then disposed over at least a portion of the conductive layer 204. The dielectric layer 206 is a coupling adhesive that allows the PEC 210 to be adhered and coupled to the antenna structure 204, acting as the dielectric in the coupling capacitors. The adhesive 206 may be formed from any suitable adhesive material as is known in the art, such as a pressure sensitive adhesive (PSA) or a hot melt adhesive. Typically, the adhesive 206 is coated onto the PEC 210 as part of its manufacturing process, and acts as a barrier layer to stop ingress of such things as moisture, oxygen, etc. that are known to degrade the performance of common printed semiconductor materials such as those created using polyaniline and its derivatives, amorphous silicon or metal oxides.

A printed electronic circuit (PEC) 210 disposed over at least a portion of the dielectric layer 206, such that the dielectric layer 206 fully covers the PEC 210 and acts as a barrier layer to protect against oxygen and moisture ingress. Typically, the continuous coating (dielectric layer) 206, without apertures, is easier to apply in production. The PEC 210 further comprises at least two conductor pads 212 disposed on at least a portion of the PEC 210, wherein the at least two conductor pads 212 on the PEC 210 are capacitively coupled to the at least two conductor pads on the conductive layer 204.

Further, the PEC 210 is typically attached to a carrier or strap 214 (or interposer). Strap or interposer 214 may further include conductive leads to facilitate coupling between antenna structure 204 and PEC 210. For example, the adhesive 206 is used to attach the PEC 210 carrying strap 214 to the antenna 204 acting as the dielectric in the coupling capacitors. Further, coupling between antenna structure 204 and strap or interposer 214 may be a direct, conductive coupling or may be an indirect coupling, such as a capacitive or inductive coupling or any combination of conductive, capacitive and inductive coupling.

The PEC 210 carried on the strap 214 may be an RFID device, designed to operate at frequencies such as 13.56 MHz, high frequency (HF), or between 800 MHz and 1,000 MHz, commonly described as ultra-high frequency (UHF), coupled to an antenna structure 204. However, other forms of circuits can be used, such as a sensor and its associated signal processing, coupled to a standard chip made out of crystal silicon that handles the communication with the reader system.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio-frequency identification (RFID) device, comprising:
    a base layer;
    a conductive layer disposed over at least a portion of the base layer;
    a dielectric layer disposed over at least a portion of the conductive layer;
    a protective coating layer disposed over at least a portion of the dielectric layer; and
    a printed electronic circuit (PEC) disposed over at least a portion of the protective coating layer, such that the protective coating layer fully covers the PEC to protect against oxygen and moisture ingress; and
    at least two conductor pads disposed on at least a portion of the PEC, wherein the at least two conductor pads on the PEC are capacitively coupled to the conductive layer and the PEC is attached to a carrier or strap.

2. The RFID device of claim 1, wherein the conductive layer is an antenna structure.

3. The RFID device of claim 2, wherein the dielectric layer is a coupling adhesive that allows the PEC to be adhered and coupled to the antenna structure.

4. The RFID device of claim 3, wherein the protective coating layer is a thin PET film.

5. The RFID device of claim 1, wherein the device operates at a frequency of 13.56 MHz, high frequency (HF).

6. The RFID device of claim 1, wherein the device operates at a frequency between 800-1,000 MHz, ultra-high frequency (UHF).

7. A radio-frequency identification (RFID) device, comprising:
    a base layer;
    a conductive layer comprising at least two conductor pads and being disposed over at least a portion of the base layer;
    a dielectric layer that is a hot melt adhesive is disposed over at least a portion of the conductive layer; and
    a printed electronic circuit (PEC) disposed over at least a portion of the dielectric layer, such that the dielectric layer fully covers the PEC to protect against oxygen and moisture ingress; and
    at least two conductor pads disposed on at least a portion of the PEC, wherein the at least two conductor pads on the PEC are capacitively coupled to the at least two conductor pads on the conductive layer.

8. The RFID device of claim 7, wherein the conductive layer is an antenna structure.

9. The RFID device of claim 7, wherein the adhesive is coated onto the PEC as part of its manufacturing process.

10. The RFID device of claim 7, wherein the PEC is attached to a carrier or strap.

11. The RFID device of claim 10, wherein the device operates at a frequency of 13.56 MHz, high frequency (HF).

12. The RFID device of claim 10, wherein the device operates at a frequency between 800-1,000 MHz, ultra-high frequency (UHF).

13. A radio-frequency identification (RFID) device, comprising:
    a base layer;
    an antenna disposed over at least a portion of the base layer;
    an adhesive layer disposed over at least a portion of the antenna;
    a barrier layer disposed over at least a portion of the adhesive layer; and
    a printed electronic circuit (PEC) disposed over at least a portion of the barrier layer, such that the barrier layer fully covers the PEC to protect against oxygen and moisture ingress; and
    at least two conductor pads disposed on at least a portion of the PEC, wherein the at least two conductor pads on the PEC are capacitively coupled to the antenna; and
    wherein the PEC is attached to a carrier or strap and then coupled to the antenna via the adhesive layer.

14. The RFID device of claim 13, wherein the device operates at a frequency of 13.56 MHz, high frequency (HF).

15. The RFID device of claim 13, wherein the device operates at a frequency between 800-1,000 MHz, ultra-high frequency (UHF).

16. The RFID device of claim 13, wherein the barrier layer is a thin PET film.

\* \* \* \* \*